United States Patent
Nakajima

[11] Patent Number: 5,850,336
[45] Date of Patent: Dec. 15, 1998

[54] APPARATUS HAVING AN INVERTER

[75] Inventor: Shin Nakajima, Tottori, Japan

[73] Assignees: Hitachi Metals, Ltd., Tokyo; Hitachi Ferrite Electronics Ltd., Tottori, both of Japan

[21] Appl. No.: 832,690

[22] Filed: Apr. 11, 1997

[30] Foreign Application Priority Data

Apr. 19, 1996 [JP] Japan ..................... 8-098072

[51] Int. Cl.⁶ .................................................. H02M 3/36
[52] U.S. Cl. ........................... 363/39; 307/105; 148/307
[58] Field of Search ........................... 307/105; 148/305, 148/307; 420/117, 121; 363/40, 131, 178

[56] References Cited

U.S. PATENT DOCUMENTS 5,725,686  3/1998  Yoshizawa et al. ................. 148/307

FOREIGN PATENT DOCUMENTS 58-44704  3/1983  Japan .
7-278764  10/1995  Japan .

*Primary Examiner*—Shawn Riley
*Attorney, Agent, or Firm*—Finnegan, Henderson, Farabow, Garrett & Dunner

[57] ABSTRACT

A small-sized apparatus having an inverter which can satisfy EMC standards by providing a small zero phase-sequence reactor which has a high noise attenuation rate over a wide frequency range and wide working temperature range. The apparatus having an inverter comprising a line-noise filter connected between a power supply and the inverter and a zero phase-sequence reactor connected between the inverter and a load is characterized in that the zero phase-sequence reactor connected between the inverter and the load comprises a tape-wound magnetic core formed by winding a nanocrystalline soft-magnetic alloy tape in which nanocrystalline grains not larger than 50 nm in grain size account for at least 50% in volume of the structure; the tape-wound core having the AC relative initial permeability $\mu ri$ (10 kHz) at the magnetizing force peak value of 0.05 A/m and the frequency of 10 kHz of 20,000 to 200,000, and the AC relative initial permeability $\mu ri$ (100 kHz) at the magnetizing force peak value of 0.05 A/m and the frequency of 100 kHz of not less than 10,000.

6 Claims, 5 Drawing Sheets

APPARATUS HAVING AN INVERTER

DETAILED DESCRIPTION OF THE INVENTION

BACKGROUND OF THE INVENTION

This invention relates to an apparatus having an inverter, used for, for example, machine tools, elevators, air-conditioning equipment, pump units, printing presses, uninterruptible power supplies, which has satisfied EMC (electromagnetic compatibility) standards.

With the increased popularization of semiconductor switching elements, inverters have been rapidly and widely used as speed controllers for electric motors, uninterruptible power supplies and DC power supplies. With the development of high-power semiconductor switching elements for higher frequencies as represented by IGBTs (insulated-gate bipolar transistors), there is a growing tendency toward high-power inverters for higher frequencies, including low-audio-noise inverter units having the switching frequency set to a level above the upper limit of the audible frequency band.

As such high-frequency inverters have become popular, however, radio frequency noise generated by the switching operation of semiconductor elements in these devices has often caused a number of problems, such as interference via power lines with other electronic equipment connected to the same power line, or interference with nearby electronic equipment as radiation noise via space.

As means for suppressing such radio frequency line noise transmitted to the power line or radiation noise emitted into space by switching equipment that carries out switching operation, a line-noise filter 2 is connected between a power supply 1 and an inverter 3, or a common-mode choke coil, generally called a zero phase-sequence reactor 4, between the inverter 3 and a load 5, as shown in a block diagram of FIG. 1.

In addition, a function for preventing the inverter 3 from malfunctioning due to the radio frequency noise entering in the inverter 3 from the power supply 1 or the load 5 is also often added to the line-noise filter 2 and the zero phase-sequence reactor 4.

The Mn—Zn ferrite core or the Ni—Zn ferrite core has heretofore been used for zero phase-sequence reactors.

Any attempt to satisfy various noise standards, such as Part 15 of U.S. FCC (Federal Communications Commission), VDE (Verband Deutscher Elektrotechniker) 0871 of FTZ (Fenmeldetechnisches Zentralamt), VCCI (Voluntary Control for Interference by Information Technology Equipment), CISPR (Comite International Special des Perturbations Radioelectriques) and other noise standards using a conventional zero phase-sequence reactor in equipment generating high levels of radio-frequency noise, such as a high-frequency inverter of a low audio noise type using IGBTs would inevitably involve an increase in the size of zero phase-sequence reactors or systems using an inverter itself.

That is, zero phase-sequence reactors have heretofore had to be made larger in size because the AC relative initial permeability $\mu$ri (10 kHz) of the Mn—Zn ferrite core is only on the order of 7,000 or less at 10 kHz and the corresponding figure at 100 kHz is on the order of 5,000 or less. In addition, little noise suppression effect in frequency bands above 1 MHz can be expected from the Mn—Zn ferrite core whose permeability drops sharply around 1 MHz. For this reason, whenever noise in frequency bands above 1 MHz becomes a problem, zero phase-sequence reactors using Ni—Zn cores would have to be added. This would in turn result in a further increase in the size of zero phase-sequence reactors or apparatus having an inverter.

Furthermore, since the Curie temperature of the Mn—Zn ferrite core is only of the order of 160° C., its effective saturation magnetic flux density at 85° C., the generally accepted upper limit of operating temperature, is as low as approximately 0.3 T, about 70% of the saturation magnetic flux density at 20° C., while the residual magnetic flux density at 20° C. and 85° C. remain virtually unchanged at about 0.1 T. As a result, the maximum operating magnetic flux density $\Delta$Bm when excited by a unipolar square wave at 85° C. becomes approximately 0.2 T, some 60% of the corresponding figure at 20° C. This also causes the pulse attenuation characteristic, a measure of the performance of suppressing pulse noise entering from the load to the apparatus, at 85° C. to lower to about 60% of that at 20° C. This could often lead to malfunction of the apparatus having an inverter when pulse-shaped noise enters from the load.

SUMMARY OF THE INVENTION

It is an object of this invention to provide an apparatus having an inverter which can satisfy the EMC standards by using a small-sized zero phase-sequence reactor having high noise attenuation rates that have heretofore been difficult to realize over a wide frequency region in a wide working temperature range.

In an apparatus having an inverter, according to this invention, having a line-noise filter connected between a power supply and an inverter, and a zero phase-sequence reactor connected between the inverter and a load, the zero phase-sequence reactor connected between the inverter and the load comprises a tape-wound core using a nanocrystalline soft-magnetic alloy tape in which nanocrystalline grains not larger than 50 nm in grain size account for at least 50% in volume of the alloy structure; the core has the AC relative initial permeability $\mu$ri (10 kHz) at the magnetizing force peak value of 0.05 A/m and the frequency of 10 kHz of 20,000 to 200,000, and the AC relative initial permeability $\mu$ri (100 kHz) at the magnetizing force peak value of 0.05 A/m and the frequency of 100 kHz of not less than 10,000.

The use of the zero phase-sequence reactor with the tape-wound core using the nanocrystalline soft-magnetic alloy tape allows not only line noises ranging from 0.5 MHz to tens of MHz but also radiation noises ranging from tens of MHz to 100 MHz to be suppressed substantially. This lends itself to reduction in the sizes not only of a zero phase-sequence reactor but also of an apparatus having an inverter.

In the apparatus having an inverter according to this invention, when the tape-wound core using a nanocrystalline soft-magnetic alloy tape has not more than 0.3 of the squareness Brms/Bms, that is, the ratio of the residual magnetic flux density Brms to the saturation magnetic flux density Bms in the DC B-H loop at the magnetizing force peak value 800 A/m, the effect of suppressing line noises ranging from 0.5 MHz to tens of MHz and radiation noises ranging from tens of MHz to 100 MHz can be improved, and the pulse attenuation characteristic as a measure of the performance of suppressing pulse noise entering into the apparatus from the load is also remarkably improved. This also prevents the apparatus having an inverter from malfunctioning due to pulse-shaped noise entering from the load.

In the apparatus having an inverter of this invention, it is more preferable that the tape-wound core has not more than 0.3 of the squeareness Brms/Bms, that is, the ratio of the residual magnetic flux density Brms to the saturation magnetic flux density Bms in the DC B-H loop at the magnetizing force peak value 800 A/m and has the AC relative initial permeability $\mu$ri (10 kHz) at the magnetizing force peak value of 0.05 A/m and the frequency of 10 kHz of 50,000 to 150,000, and the AC relative initial permeability $\mu$ri (100 kHz) at the magnetizing force peak value of 0.05 A/m and the frequency of 100 kHz of not less than 15,000. The suppression effect of line noises rangin from 0.5 MHz to tens of MHz and radiation noises ranging from tens of MHz to 100 MHz can be further improved, and the pulse attenuation characteristic as a measure of the performance of suppressing pulse noise entering into the apparatus from the load is also more remarkably improved. This results in prevention of the apparatus having an inverter from malfunctioning due to pulse-shaped noise entering from the load.

The apparatus having an inverter whose load is an electric motor requires a few meters to tens of meters of inverter output cables to connect the inverter and the motor. This could increase line noise and radiation noise due to the effects of the output cables. The present invention, when used in such apparatus, can easily satisfy EMC standards that have hitherto been difficult to realize.

DESCRIPTION OF THE PREFERRED EMBODIMENTS

Figure 1:
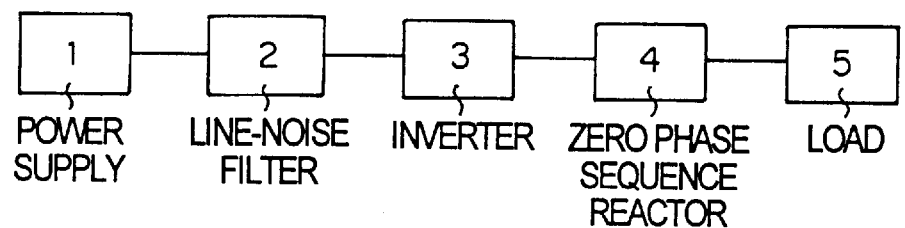
FIG. 1 is a block diagram illustrating the construction of an apparatus having an inverter according to this invention.

In the following, embodiments of this invention will be described in detail, but it should be noted that this invention is not limited to these embodiments.

Noise terminal voltage and radiation noise were measured by connecting a line-noise filter 2 between a power supply 1 and an inverter 3 with an output of three-phase AC 200V, rated output capacity of 6.6 kVA for driving a three-phase induction motor with an input of three-phase AC 200 V and an output of 3.7 KW as a load 5, and a zero phase-sequence reactor 4 between the inverter 3 and the motor as the load 5.

The inverter 3 was carrying out switching operations at a fundamental frequency of 15 kHz by means of an IPM (intelligent power module) using an IGBT (insulated-gated bipolar transistor).

Figure 2:
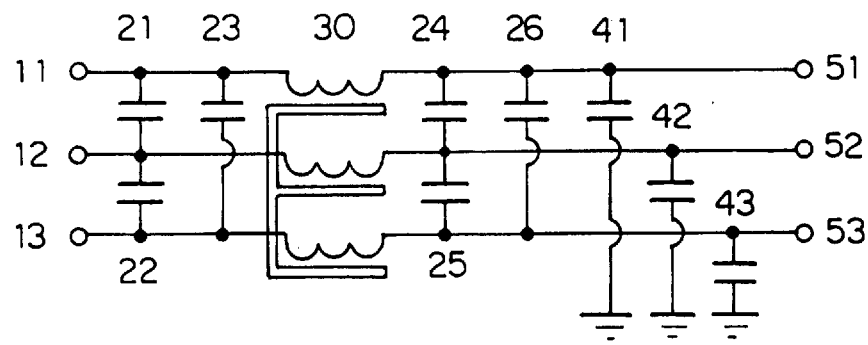
FIG. 2 is a circuit diagram illustrating the construction of a line-noise filter employed in the apparatus having an inverter according to this invention.

The line-noise filter 2 used is of a type having a circuit configuration shown in FIG. 2. In FIG. 2, reference numerals 11, 12 and 13 refer to input terminals; 21, 22, 23, 24, 25 and 26 to metallized polyester-film capacitors of 0.22 $\mu$F in capacitance, connected across the power lines; 30 to a common-mode choke coil; 41, 42 and 43 to ceramic capacitors of 4700 pF in capacitance, connected between the power line and the ground; and 51, 52 and 53 to output terminals, respectively.

The common-mode choke coil 30 in FIG. 2 was manufactured by using a toroidal-shaped tape-wound core of 64 mm OD and 42 mm ID made of an amorphous soft-magnetic alloy tape of 15 mm in width and about 20 $\mu$m in thickness, manufactured with a single-roll process, and having a chemical composition of $Fe_{73.5}Cu_1Nb_3Si_{13.5}B_9$. The tape-wound core was then heat-treated in a nitrogen atmosphere at 550° C., a temperature above the crystallizing temperature of the amorphous soft-magnetic alloy, thereafter allowed to cool slowly. 16 turns of winding were wound on the resulting core having magnetic characteristics as shown in Table 1.

TABLE 1

| Bs(T) | Brms/Bms | $\mu$ ri (10 kHz) | $\mu$ ri (100 kHz) |
|---|---|---|---|
| 1.24 | 0.63 | 76,000 | 18,000 |

15 types of magnetic cores; Cores 1 through 12, and Cores a through c in Table 2, were used for the zero phase-sequence reactor 4,. Cores given in Table 2 were all of a toroidal shape, 65 mm OD, 45 mm ID and 20 mm high, housed in a polyethylene terephthalate case. Up to five turns of a cable connecting the inverter 3 to an electric motor as the load 5 were wound on them to form common-mode choke coils.

Note that it would be difficult to wind more than six turns of winding on the zero phase-sequence reactor 4 of this embodiment due to limitations in the inside diameter of the core. Needless to say, more than six turns of winding can be wound on it by changing the inside diameter of the core.

In Table 2, Cores 1 through 12 were magnetic cores made of a nanocrystalline soft-magnetic alloy. That is, Cores 1 through 12 were toroidal-shaped tape-wound cores formed by using a 20 mm-wide, about 20 $\mu$m-thick amorphous soft-magnetic alloy tape manufactured with a single-roll process and having a chemical composition of $Fe_{73.5}Cu_1Nb_3Si_{13.5}B_9$. The core was then heat-treated in a nitrogen atmosphere at 550° C., a temperature above the crystallizing temperature of the amorphous soft-magnetic alloy, and allowed to cool slowly.

Cores 1 through 4, and Core 12 were heat-treated in non-magnetic field while changing the 550° C. heat-treatment time and the cooling rate at which they were cooled slowly from 550° C. to room temperature so as to change their magnetic characteristics. Furthermore, Cores 5 through 11 were heat-treated in a DC magnetic field normal to the magnetic path of the core while changing the heat-treatment time so as to change their magnetic characteristics. Cores 1 through 12 were manufactured in such a manner that their packing factor K becomes 0.8.

TABLE 2

| Name of core | Material of core | Bs (T) | Brms/ Bms | $\mu$ ri (10 kHz) | $\mu$ ri (100 kHz) |
|---|---|---|---|---|---|
| Core 1 | Fe-based nanocrystal | 1.23 | 0.57 | 32,000 | 22,000 |
| Core 2 | Fe-based nanocrystal | 1.24 | 0.61 | 52,000 | 24,000 |
| Core 3 | Fe-based nanocrystal | 1.24 | 0.63 | 76,000 | 18,000 |
| Core 4 | Fe-based nanocrystal | 1.24 | 0.58 | 98,000 | 13,000 |
| Core 5 | Fe-based nanocrystal | 1.24 | 0.05 | 24,000 | 17,000 |
| Core 6 | Fe-based nanocrystal | 1.23 | 0.09 | 53,000 | 24,000 |
| Core 7 | Fe-based nanocrystal | 1.24 | 0.15 | 96,000 | 22,000 |
| Core 8 | Fe-based nanocrystal | 1.24 | 0.23 | 146,000 | 16,000 |
| Core 9 | Fe-based nanocrystal | 1.24 | 0.25 | 172,000 | 13,000 |
| Core 10 | Fe-based nanocrystal | 1.23 | 0.32 | 215,000 | 9,300 |

TABLE 2-continued

| Name of core | Material of core | Bs (T) | Brms/Bms | μ ri (10 kHz) | μ ri (100 kHz) |
|---|---|---|---|---|---|
| Core 11 | Fe-based nanocrystal | 1.24 | 0.04 | 18,000 | 12,000 |
| Core 12 | Fe-based nanocrystal | 1.23 | 0.67 | 18,000 | 9,100 |
| Core a | Mn—Zn ferrite | 0.48 | 0.22 | 7,300 | 7,600 |
| Core b | Co-based amorphous | 0.55 | 0.63 | 107,000 | 13,000 |
| Core c | Fe-based amorphous | 1.61 | 0.21 | 8,300 | 6,800 |

Core a is a Mn—Zn ferrite core. Cores b and c are cores manufactured by using a 20 mm-wide, about 20 μm-thick amorphous soft-magnetic alloy tape consisting mainly of Co with additives of Fe, Mo, Si and B, and a 20 mm-wide, about 20 μm-thick amorphous soft-magnetic alloy tape consisting mainly of Fe with additives of Si and B, respectively; both formed into a toroidal-shaped core, heat-treated in a nitrogen atmosphere at a temperature below the crystallizing temperature of the amorphous soft-magnetic alloy and allowed to cool slowly. Cores b and c were manufactured in such a manner that their dimensions are the same as Cores 1 through 12 and their packing factor K becomes 0.8.

Figure 3:
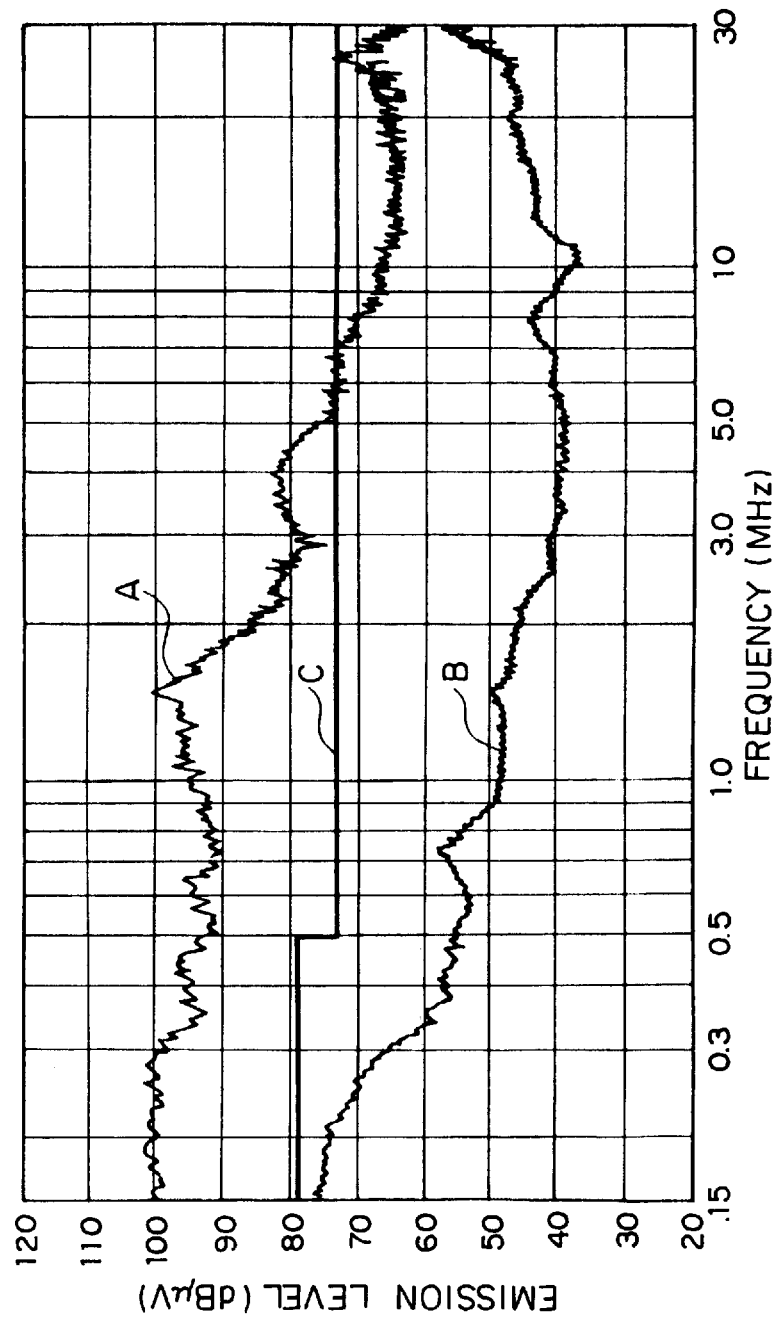
FIG. 3 is a diagram comparing the measurement results of noise terminal voltages in the apparatus according to this invention and an apparatus as a reference.

The noise terminal voltage of the apparatus having the inverter 3 embodying this invention having the zero phase-sequence reactor 4 manufactured with three-turn winding on Core 6 shown in Table 2 above and connected between the inverter 3 and an electric motor as the load 5 was measured. The measurement results are shown in FIG. 3. In FIG. 3, A indicates the measurement results without the line-noise filter 2 and the zero phase-sequence reactor 4, B indicates the measurement results with the line-noise filter 2 and the zero phase-sequence reactor 4, and C indicates CISPR Pub. 11 Class A standard values. As is apparent from FIG. 3, the noise terminal voltage of the apparatus having the inverter 3 and the magnetic core 6 embodying this invention satisfies the CISPR Pub. 11 Class A standard values with an allowance of 3 dB μV or more.

Figure 4:
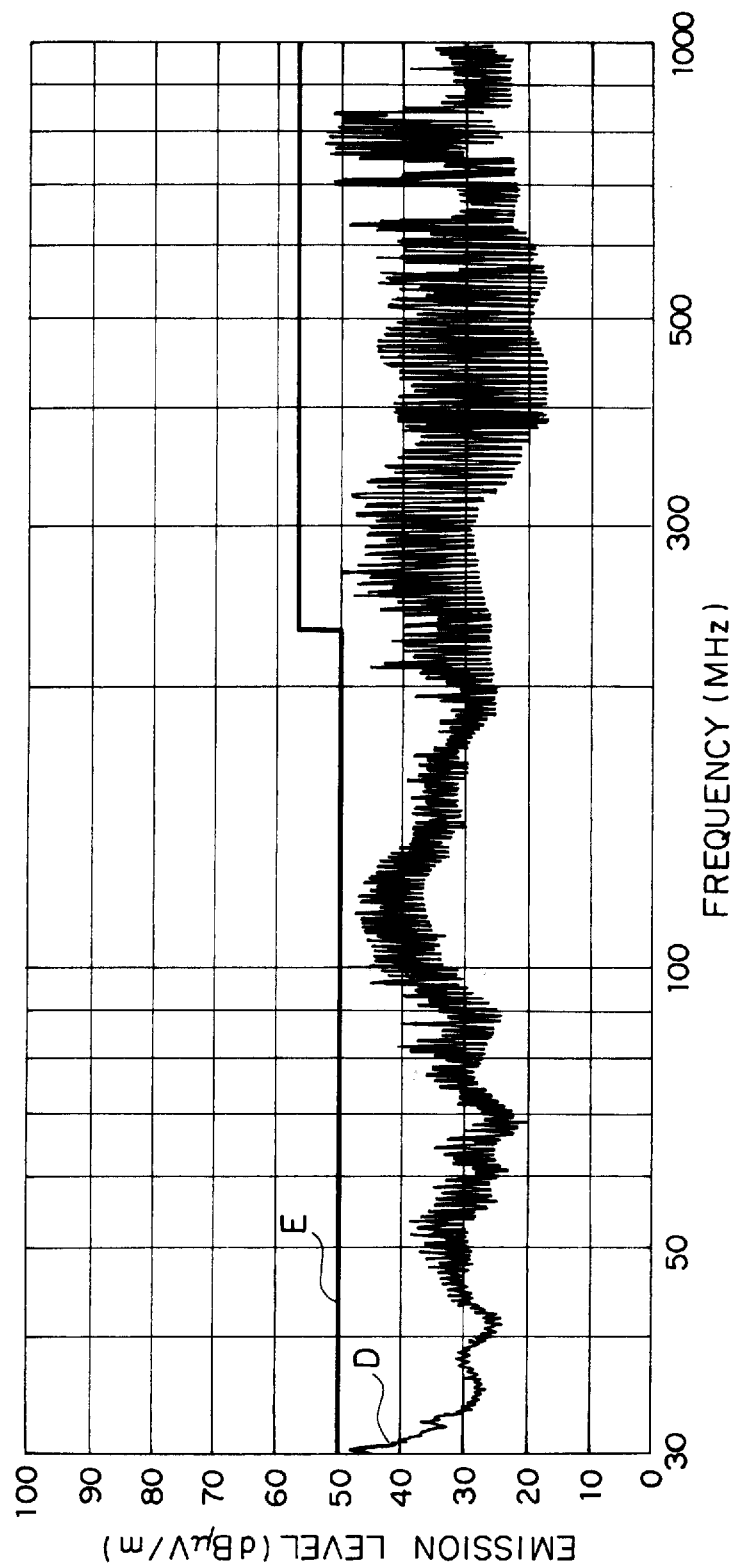
FIG. 4 is a diagram showing the measurement results of radiation noise in the apparatus according to this invention.

The measurement results of radiation noise generated by a system using Core 6 embodying this invention are shown in FIG. 4. In FIG. 4, D indicates measurement results, and E indicates CISPR Pub. 22 Class A standard values. As is evident from FIG. 4, the radiation noise generated by the apparatus having the inverter 3 with Core 6 embodying this invention satisfies the CISPR Pub. 22 Class A standard values with an allowance of 3 dB μV/m or more.

Figure 5:
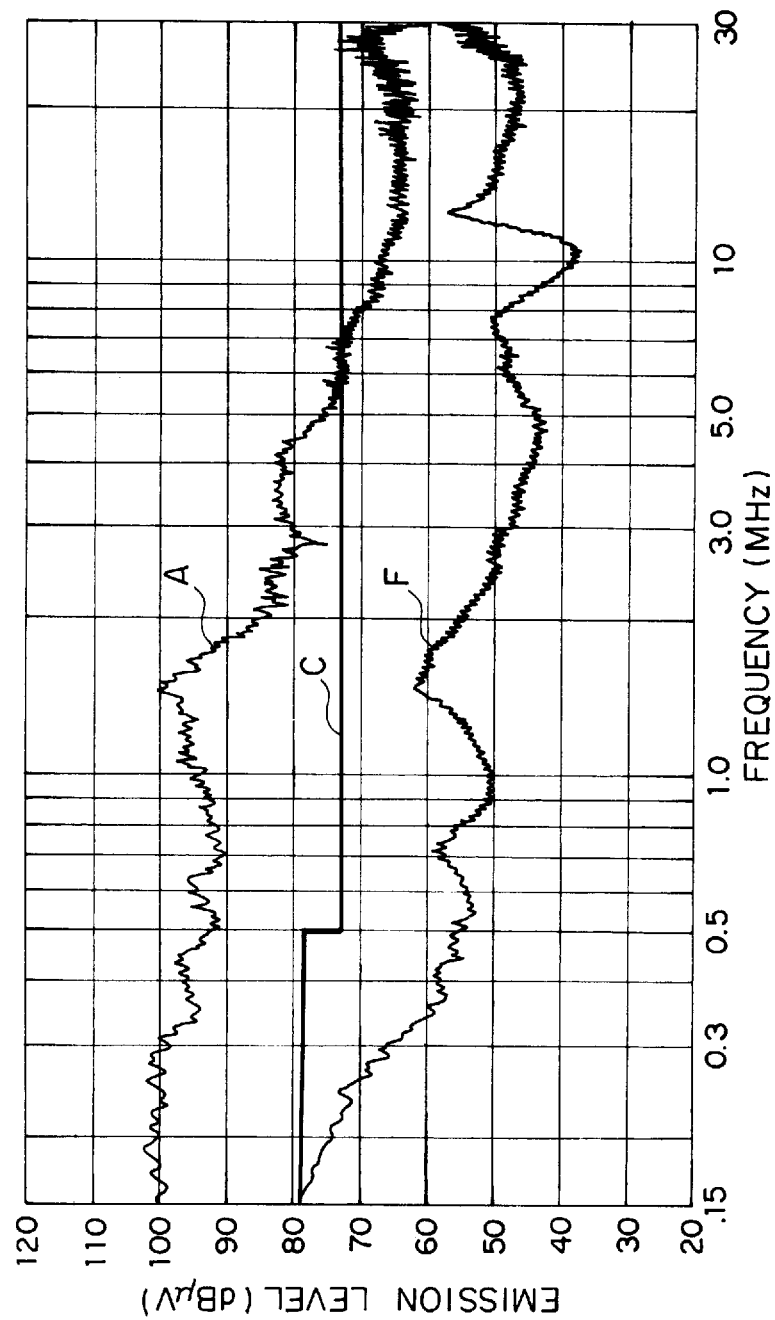
FIG. 5 is a diagram showing the measurement results of line terminal voltage in the apparatus as a reference.

For comparison, the measurement results of the noise terminal voltage of Comparison Example 4 comprising the zero phase-sequence reactor 4 having five turns of winding on Core a in Table 2, connected between the inverter 3 and an electric motor as the load 5 as shown in FIG. 1, are shown in FIG. 5.

In FIG. 5, A indicates the measurement results without the line-noise filter 2 and the zero phase-sequence reactor 4, F indicates the measurement results with the line-noise filter 2 and the zero phase-sequence reactor 4 with Core a, and C indicates CISPR Pub. 11 Class A standard values. As is evident from FIG. 5, the noise terminal voltage of the apparatus having the inverter 3 with Comparison Example 4 barely satisfies the CISPR Pub. 11 Class A standard values.

Figure 6:
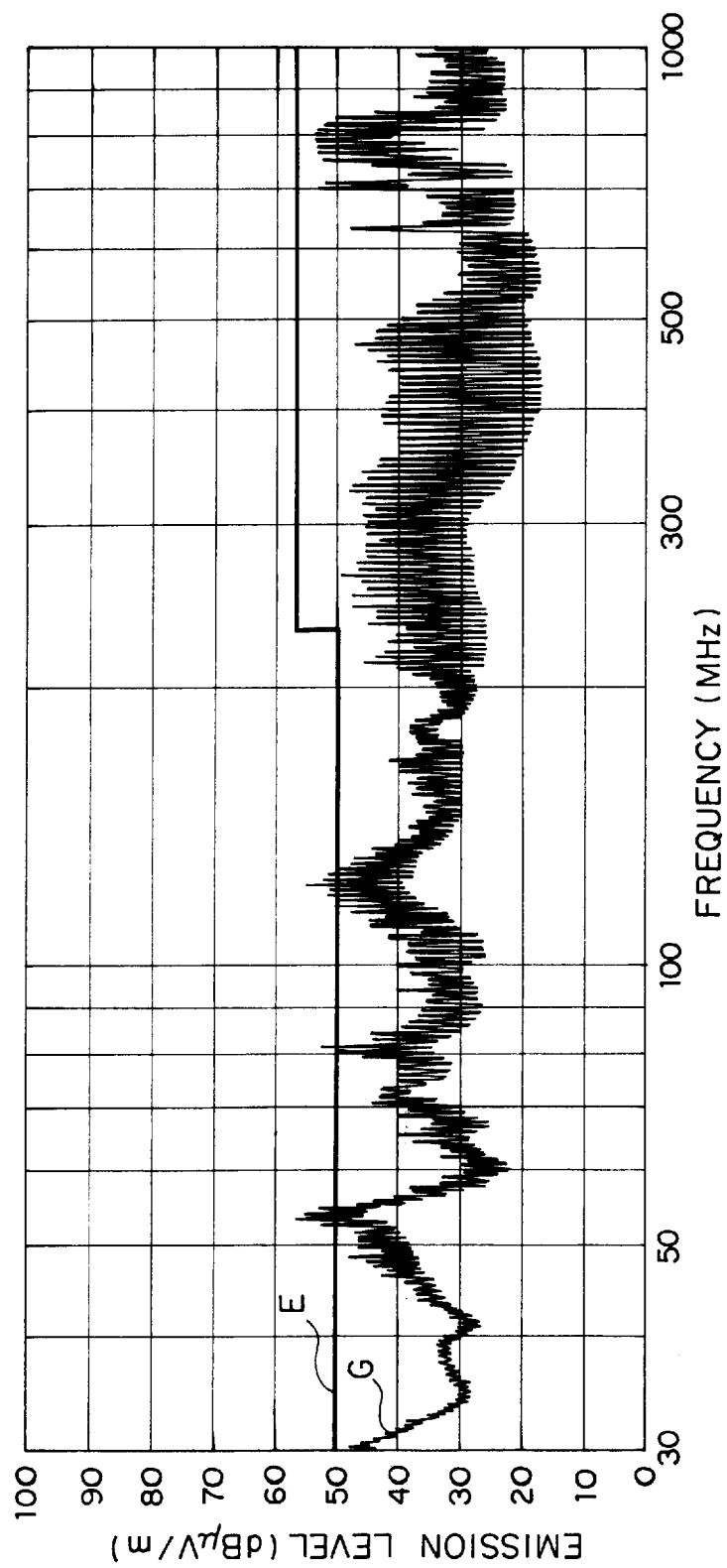
FIG. 6 is a diagram showing the measurement results of radiation noise in the apparatus as a reference.

The measurement results of radiation noise in the apparatus having the inverter 3 with Comparison Example 4 are shown in FIG. 6. In FIG. 6, G indicates the measurement results, and E indicates CISPR Pub. 22 Class A standard values. FIG. 6 reveals that the radiation noise of the apparatus having the inverter 3 with Comparison Example 4 does not satisfy the CISPR Pub. 22 Class A standard values.

When comparing the apparatus with Core 6 of this invention with the apparatus with Comparison Example 4, the difference in the noise suppression effect in terms of noise terminal voltage is pronounced in the frequency region of approx. 1 MHz or more, while the corresponding difference in terms of radiation noise is also remarkable in the frequency region of 200 MHz or less. This indicates that the apparatus with Core 6 of this invention is superior in noise suppression effect to the apparatus with Comparison Example 4.

Table 3 shows the measurement results of noise terminal voltage and radiation noise in the apparatus having the inverter 3 and an electric motor as the load 5 in which the zero phase-sequence reactors 4 formed by using the magnetic cores given in Table 2 were connected in such a configuration as shown in FIG. 1.

In the table, the case where the noise terminal voltage value satisfies the CISPR Pub. 11 Class A requirement with an allowance of 3 dB μV or more is rated as Excellent, the case where the value satisfies the CISPR Pub 11 Class A requirement with an allowance of less than 3 dB μV as Good, and the case where the value does not satisfy the CISPR Pub. 11 Class A requirement as No Good.

Also, the case where the radiation noise satisfies the CISPR Pub 22 Class A requirement with an allowance of 3 dB μV/m or more is rated as Excellent, the case where the value satisfies the CISPR Pub 22 Class A requirement with an allowance of less than 3 dB μV/m as Good, and the case where the value does not satisfy the CISPR Pub. 22 Class A requirement as No Good.

Table 3 reveals that only the apparatus using the zero phase-sequence reactor 4 with the core prepared by winding the nanocrystalline soft-magnetic alloy tape according to this invention, and the apparatus using the zero phase-sequence reactor 4 with the core prepared by winding the Co-based amorphous soft-magnetic alloy tape as shown in Comparison Example 5 satisfy both the CISPR Pub. 11 Class A and the CISPR Pub. 22 Class A requirements.

However, the measurement results of noise terminal voltage in the apparatus having the zero phase-sequence reactor 4 using the aforementioned various types of cores, connected between the inverter 3 and an electric motor as the load 5, as shown in FIG. 1, which was operated continuously for 1,000 hours at the ambient temperature of 40° C. reveal that the apparatus using the zero phase-sequence reactor 4 prepared by winding the Co-based amorphous soft-magnetic alloy tape, that is Core b, involves the problem of aging, failing to meet the CISPR Pub. 22 Class A requirement.

No deterioration of characteristics due to aging was not encountered with Examples 1 through 9, and Comparison Examples 1 through 4 and 6, with the exception of Comparison Example 5.

TABLE 3

| | Core used | No. of turns | Noise terminal voltage | Radiation noise |
|---|---|---|---|---|
| Example 1 | Core 1 | 5 | Excellent | Good |
| Example 2 | Core 2 | 4 | Excellent | Good |
| Example 3 | Core 3 | 5 | Excellent | Good |
| Example 4 | Core 4 | 5 | Excellent | Good |
| Example 5 | Core 5 | 4 | Excellent | Good |
| Example 6 | Core 6 | 3 | Excellent | Excellent |
| Example 7 | Core 7 | 3 | Excellent | Excellent |
| Example 8 | Core 8 | 3 | Excellent | Excellent |
| Example 9 | Core 9 | 5 | Excellent | Good |

TABLE 3-continued

|  | Core used | No. of turns | Noise terminal voltage | Radiation noise |
|---|---|---|---|---|
| Comp. Ex. 1 | Core 10 | 5 | Good | No Good |
| Comp. Ex. 2 | Core 11 | 5 | Good | No Good |
| Comp. Ex. 3 | Core 12 | 5 | Good | No Good |
| Comp. Ex. 4 | Core a | 5 | Good | No Good |
| Comp. Ex. 5 | Core b | 5 | Excellent | Good |
| Comp. Ex. 6 | Core c | 5 | Good | No Good |

Comp. Ex. = Comparison Example

An investigation of the causes indicates that the deterioration of characteristics was caused by lowered AC relative initial permeability due to induced magnetic anisotropy that is inevitable with high-permeability cores manufactured by winding the Co-based soft-magnetic alloy tape.

It was found therefore that when taking into account stability with time, only the apparatus using the zero phase-sequence reactor 4 with a core formed by winding the nanocrystalline soft-magnetic alloy tape according to this invention can meet the CISPR Pub. 22 requirement.

It was also found that the apparatus having the inverter 3 having the zero phase-sequence reactor 4 formed by winding the nanocrystalline soft-magnetic alloy tape according to this invention has such excellent characteristics that both the CISPR Pub 11 Class A and CISPR Pub. 22 Class A requirements can be satisfied with allowances of 3 dB $\mu$V or more and 3 dB $\mu$v/m or more, respectively, when its AC relative initial permeability $\mu$ri (10 kHz) at the magnetizing force peak value of 0.05 A/m and the frequency of 10 kHz is 50,000 to 150,000, its AC relative initial permeability $\mu$ri (100 kHz) at the magnetizing force peak value of 0.05 A/m and the frequency of 100 kHz is not less than 15,000, and the squareness Brms/Bms, that is, the ratio of the residual magnetic flux density Brms to the saturation magnetic flux density Bms, in a DC B-H loop at the maximum magnetizing force of 800 A/m is not more than 0.3.

It was also found that the apparatus having the inverter 3 having the zero phase-sequence reactor 4 manufactured by winding the nanocrystalline soft-magnetic alloy tape according to this invention is superior in preventing the malfunction of the inverter 3 due to the pulse noise from the electric motor as the load 5 because Examples 5 through 9 having cores of the zero phase-sequence reactor 4 whose squareness Brms/Bms (i.e., the ratio of the residual magnetic flux density Brms to the saturation magnetic flux density Bms in the DC B-H loop) at the maximum magnetizing force value of 800 A/m is not more than 0.3 have about twice as much pulse attenuation characteristics, compared with the apparatus with the zero phase-sequence reactor 4 in Examples 1 through 4.

In this embodiment, description has been made about a specific example having an electric motor used as the load of the inverter 3, but needless to say, the load 5 is not limited to an electric motor.

As described above, the apparatus having an inverter 3 according to this invention where a line-noise filter 2 is connected between a power supply 1 and an inverter 3 and the zero phase-sequence reactor 4 is connected between the inverter 3 and the load 5 is a small-sized, low-noise extremely reliable device having good stability with time due to the effect of the zero phase-sequence reactor 4 having excellent attenuation characteristics with respect to both noise terminal voltage and radiation noise over a wide frequency range.

What is claimed is:

1. An apparatus having an inverter comprising a line-noise filter between a power source and an inverter, and a radiation noise filter comprising a zero phase-sequence reactor provided between the inverter and a load; wherein the zero phase-sequence reactor further comprises a tape-wound core using a nanocrystalline, soft-magnetic alloy tape in which nanocrystalline grains not larger than 50 nm in grain size account for at least 50% in volume of the alloy structure; and the tape-wound core has an AC relative initial permeability $\mu$ri (10 kHz) at the magnetizing-force peak value of 0.05 A/m and the frequency of 10 kHz of 20,000 to 200,000, and an AC relative initial permeability $\mu$ri (100 kHz) at the magnetizing-force peak value of 0.05 A/m and the frequency of 100 kHz of not less than 10,000.

2. An apparatus having an inverter as set forth in claim 1, wherein the load is an electric motor.

3. An apparatus having an inverter as set forth in claim 1, wherein the tape-wound core using the nanocrystalline, soft-magnetic alloy tape has a squareness Brms/Bms, i.e., a ratio of residual magnetic-flux density Brms to saturation magnetic-flux density Bms in the DC B-H loop, of not more than 0.3 when the magnetizing-force peak value is 800 A/m.

4. An apparatus having an inverter as set forth in claim 3, wherein the load is an electric motor.

5. An apparatus having an inverter as set forth in claim 1, wherein the tape-wound core using the nanocrystalline, soft-magnetic alloy tape has an AC relative initial permeability $\mu$ri (10 kHz) at the magnetizing-force peak value of 0.05 A/m and the frequency of 10 kHz of 50,000 to 150,000, an AC relative initial permeability $\mu$ri (100 kHz) at the magnetizing-force peak value of 0.05 A/m and the frequency of 100 kHz of not less than 15,000, and a squareness Brms/Bms, i.e., a ratio of residual magnetic flux density Brms to saturation magnetic-flux density Bms in the DC B-H loop, of not more than 0.3 when the magnetizing-force peak value is 800 A/m.

6. An apparatus having an inverter as set forth in claim 5, wherein the load is an electric motor.

* * * * *